(12) United States Patent
Taylor (10) Patent No.: US 9,611,744 B2
(45) Date of Patent: Apr. 4, 2017

(54) INTERCOOLED COMPRESSOR FOR A GAS TURBINE ENGINE

(71) Applicant: Betty Jean Taylor, Maineville, OH (US)

(72) Inventor: Jack R. Taylor, Maineville, OH (US)

( * ) Notice: Subject to any disclaimer, the term of this patent is extended or adjusted under 35 U.S.C. 154(b) by 0 days.

(21) Appl. No.: 14/677,539

(22) Filed: Apr. 2, 2015

(65) Prior Publication Data

US 2016/0010498 A1   Jan. 14, 2016

Related U.S. Application Data

(60) Provisional application No. 61/975,557, filed on Apr. 4, 2014.

(51) Int. Cl.
*F04D 29/58* (2006.01)
*F01D 5/18* (2006.01)
*F04D 29/54* (2006.01)

(52) U.S. Cl.
CPC ........... *F01D 5/187* (2013.01); *F04D 29/542* (2013.01); *F04D 29/584* (2013.01); *F05D 2260/211* (2013.01); *F05D 2260/213* (2013.01); *Y02T 50/675* (2013.01)

(58) Field of Classification Search
CPC . F01D 1/02; F01D 5/148; F01D 9/041; F01D 25/12; F05D 2260/211
See application file for complete search history.

(56) References Cited

U.S. PATENT DOCUMENTS

| | | |
|---|---|---|
| 3,756,020 A | 9/1973 | Moskowitz et al. |
| 4,113,406 A | 9/1978 | Lee et al. |
| 4,183,716 A * | 1/1980 | Takahara ............... F01D 5/189 415/115 |
| 4,286,924 A | 9/1981 | Gale |
| 4,668,164 A | 5/1987 | Neal et al. |
| 4,741,667 A | 5/1988 | Price et al. |
| 4,767,260 A | 8/1988 | Clevenger et al. |
| 5,899,660 A | 5/1999 | Dodd |
| 6,050,082 A | 4/2000 | Leonard et al. |
| 6,241,467 B1 | 6/2001 | Zelesky et al. |
| 6,431,820 B1 | 8/2002 | Beacock et al. |
| 6,557,337 B1 | 5/2003 | Rakhmailov |
| 7,921,654 B1 | 4/2011 | Liang |
| 8,858,161 B1 * | 10/2014 | Ryznic et al. .......... F02C 7/143 415/1 |
| 2011/0283711 A1* | 11/2011 | Petersson ............... F01D 9/041 60/796 |

* cited by examiner

*Primary Examiner* — John K Fristoe, Jr.
*Assistant Examiner* — Jason Fountain
(74) *Attorney, Agent, or Firm* — Hasse & Nesbitt LLC; Daniel F. Nesbitt (57) ABSTRACT

A multi-stage intercooled compressor for a gas turbine engine, including multiple stages of rotating blades and cooling stator vanes, a cooling stator vane including an outer wall that defines an internal coolant fluid passage and has a length along a centerline from a leading edge to a trailing edge of the outer wall, and an internal flow divider wall disposed within the internal passage and extending along the centerline to divide the internal coolant fluid passage into an inflow pathway and an outflow pathway.

18 Claims, 7 Drawing Sheets

INTERCOOLED COMPRESSOR FOR A GAS TURBINE ENGINE

CROSS-REFERENCE TO RELATED APPLICATIONS

This application claims the benefit of U.S. Provisional application 61/975,557, filed Apr. 4, 2014, the disclosure of which is incorporated by reference in its entirety.

FIELD OF THE INVENTION

The present invention is in the field of a gas turbine engines, and more particularly gas turbine engines for aircraft.

BACKGROUND OF THE INVENTION

Figure 1:
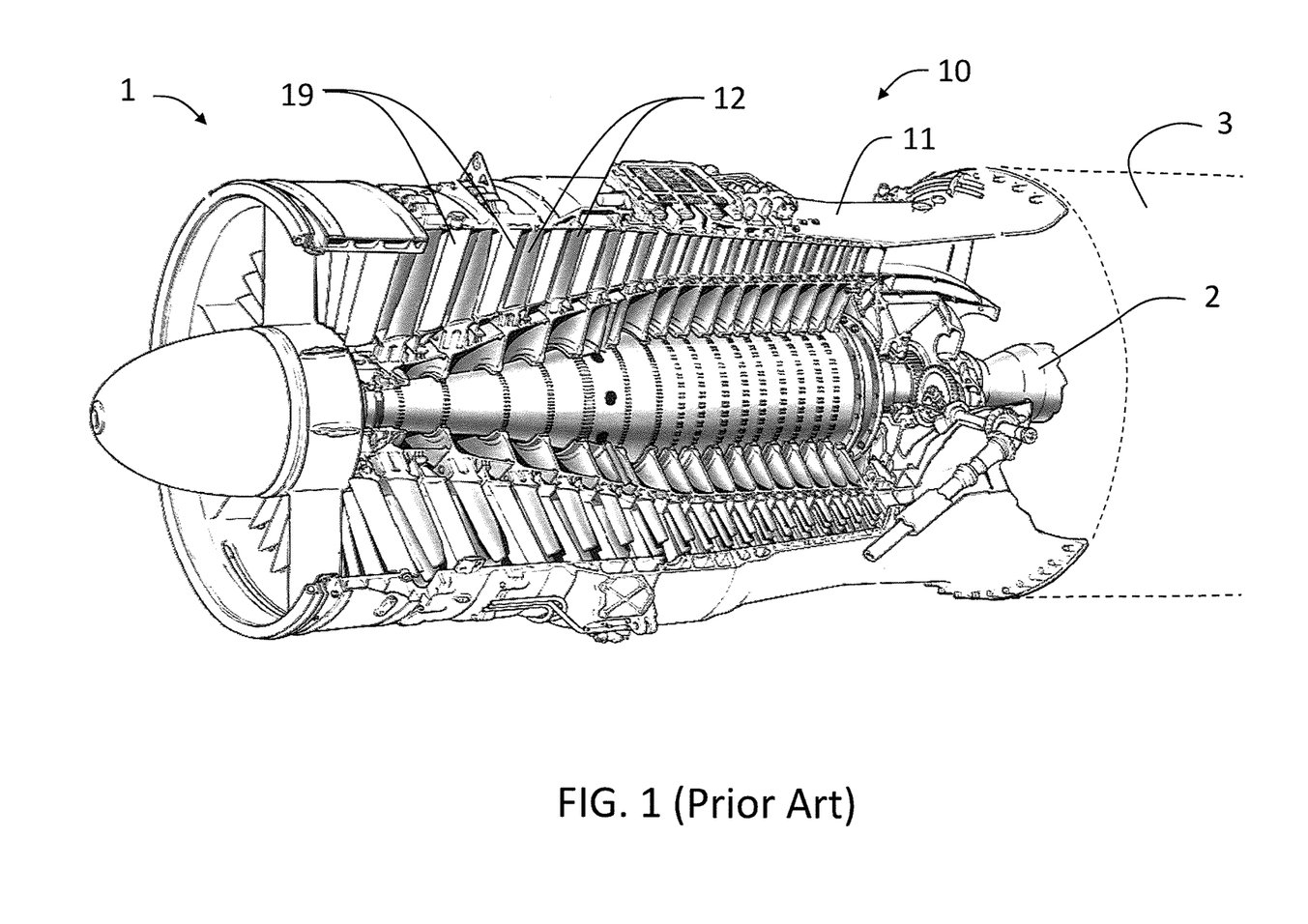
FIG. 1 shows an aircraft gas turbine engine having a multistage air compressor that includes multiple stages of rotor blades and stator vanes.

Referring to FIG. 1, an aircraft gas turbine engine 1 can have a multistage, rotating air compressor 10 that includes multiple stages of rotor blades 12 and stator vanes 19, a combustion system 3 to burn the fuel, and a multistage turbine 2 to supply the power to the compressor 10 and to direct the gas flow to the engine exit nozzle which provides the thrust force to propel the airplane (not shown). Gas turbine engine fuel efficiency is determined by the compressor pressure ratio and the turbine inlet temperature. Higher pressure ratios generally result in higher compressor exit temperatures. The compressor pressure ratio is limited by the maximum temperature that the materials of the combustion system components (including rotor blades and stator vanes) can withstand, and the maximum turbine inlet temperature is limited by the turbine nozzle vane materials and the effectiveness of the turbine cooling system.

Several stationary gas turbine engines have been designed with low pressure and high pressure compressors and with very large and heavy inter-cooling systems that cool all of the airflow between and within the compressors to achieve a lower compressor exit temperature. These engines have higher pressure ratios, which increases the fuel efficiency of the engine, without higher compressor exit temperatures.

The advantages of inter-cooling in the compressor have been recognized for many years, but no practical light weight designs for inter-cooling compressors for aircraft engines have been proposed or developed.

SUMMARY OF THE INVENTION

Aircraft engines with multi staged axial flow compressors have alternating rotating and stator vanes for each stage to increase the pressure of the airflow. The number of stages is determined by the desired exit pressure ratio. This number of stages can range from about 6 to 12 or more. Recently designed engines usually have a large number of stages. Each of the rotating stages, similar to small propellers, accelerate the airflow and direct the flow at an angle into the stationary stator vanes that curve and direct it in the downstream direction ahead of the next row of rotor blades. The curved stator vanes with adjacent vanes form an airflow passage that is a diffuser to increase the air pressure.

This present invention provides an aircraft gas turbine engine with a multi-staged, very high pressure ratio compressor that utilizes the stator vanes of each stage as air cooling vanes, with the circulation of a cooling fluid through each vane.

In an aspect of the invention, the cooling fluid covers a large surface area of the inner passage of each of the stator vanes. The surface area of an interior surface of the outer wall, exposed to cooling fluid, is at least about 90% of a surface area of an outer surface of the outer wall, exposed to compression air. The stator vane is constructed to comprise a thin outer wall material (in contact with and separating the compressed airflow and the inner cooling passage, to increase the heat transfer of the heat of the compressed air to the cooling fluid. Projections from the outer surface of the stator vanes, such as cooling fins, into the compressor air flowpath, which can result in increased pressure loss, are not required or included.

In an aspect of the invention, the cooling fluid is a cooling liquid having a vapor point below the air temperature in the compressor, to remove the heat of vaporization, which is usually very large.

In another aspect of the invention, the hot vapor from the vanes condenses in a small air-cooled radiator on the outside of the compressor case and recirculate. Even at high altitudes, the air in the aft stages of the compressor would have temperatures that are high enough to vaporize all of the coolants. The forward stages would use coolants that remain liquid. The engine pressure ratio can be increased without increasing the compressed air exit temperature beyond the temperature of a comparable engine without intercooling. Also, with a higher pressure, the turbine inlet temperature would be the same. This would result in a large increase of engine efficiency and a large decrease in fuel consumption.

A detailed cycle analysis for this engine shows that fuel consumption for this engine, for the same power output, will be almost one-half that of the original engine without the intercooling. This analysis was done with an assumption of 50% for the cooling effectiveness, which is a very conservative value. The power output and jet thrust of the engine, for the same size engine, would be much higher. The engine weight with the cooling radiators is increased by a relatively small amount, typically about the weight of the cooling radiators and the cooling fluid external to the cooling stator vanes. However, a smaller engine can be used for the same power application as a larger engine without intercooling. This would result in significant aircraft weight savings. With the higher compression ratios, the aircraft could cruise at higher altitudes, which would result in reduced drag forces and more fuel savings.

The present invention provides a multi-stage intercooled compressor for a gas turbine engine, including multiple stages of rotating blades and stator vanes, a stator vane being a cooling stator vane, the stator vane having a length along a centerline from a leading edge to a trailing edge, and including an outer wall that defines an internal passage, and an internal flow divider wall disposed within the internal passage and extending along the centerline to divide the internal passage into an inflow pathway and an outflow pathway.

The present invention also provides a method of cooling the compressed airflow passing through a multi-stage compressor, comprising the steps of: circulating a cooling fluid into a plurality of stator vanes of one or more stages of the multi-stage compressor, and passing the cooling fluid along an interior surface of an outer wall of the stator vane having a larger surface area relative to an outer surface area of an outer surface of the outer wall, thereby increasing the effectiveness of the cooling of the airflow through the compressor, and resulting in an increase in the efficiency of the engine and a reduction in the engine fuel consumption.

DETAILED DESCRIPTION OF THE INVENTION

A picture of a large aircraft engine compressor is illustrated in FIG. 1. This picture shows the states of the rotating blades and the stator vanes that are fastened to the outer engine casing.

Figure 2:
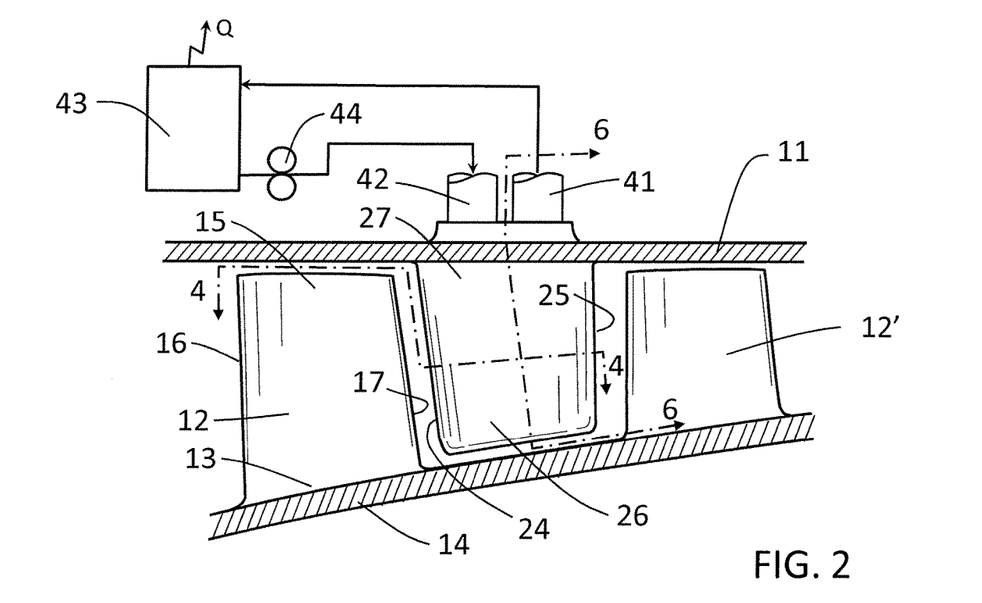
FIG. 2 shows a compression stage having a rotor blade and a cooling stator vane communicating with a coolant condensation and pumping system.

FIG. 2 shows a drawing of a typical rotor blade 12 and the downstream cooling stator vane 20 for one stage of a compressor. An adjacent rotor blade 12' is downstream of the stator vane 20 for a next stage of the compressor. The rotor blade 12 includes a base end 13 by which the rotor blade attaches to a turbine 14, and a distal edge 15, and has a length from a leading edge 16 to a trailing edge 17.

The cooling stator vane 20 includes a base end 27 by which the stator vane 20 attaches to an outer casing 11, and a distal edge 26, and has a length from a leading edge 24 to a trailing edge 25. The cooling stator vane 20 has an internal coolant passage with output connection 41 and input connection 42 on the outer casing 11. A cooling radiator 43 and a coolant pump 44 are placed outside of the casing 11. Several cooling radiators could be used, with each radiator connected to several cooling stator vanes.

Figure 3:
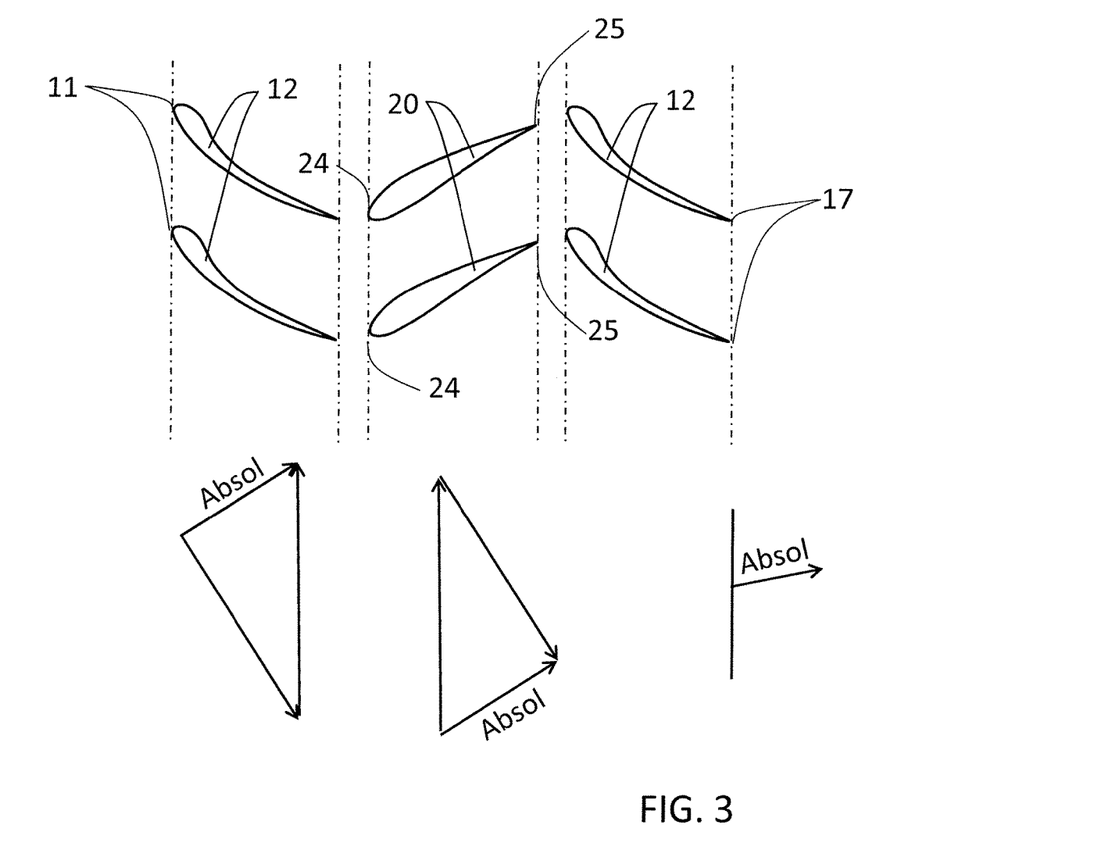
FIG. 3 shows a vector diagram of a typical compressor stage.

A vector diagram of a typical compressor stage is illustrated in FIG. 3. This diagram shows the air velocity vectors entering and leaving the rotor and stator, and the rotor wheel speed, of a typical stage.

Figure 4:
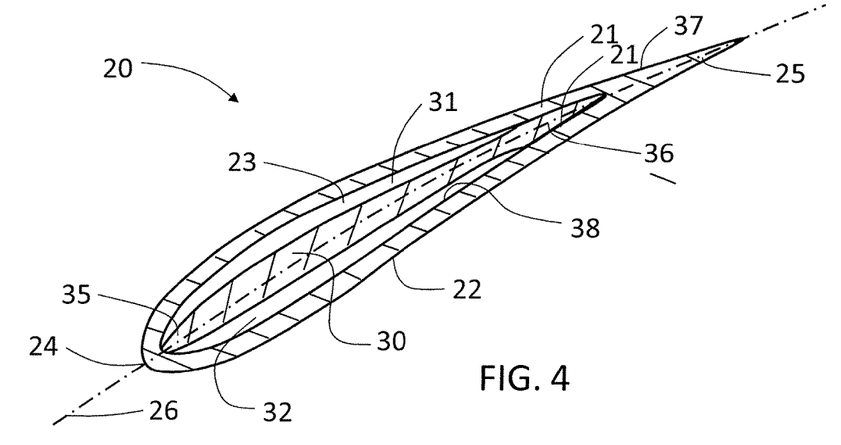
FIG. 4 shows a plan section plan view of the cooling stator vane through line 4-4 of FIG. 2.
Figure 6:
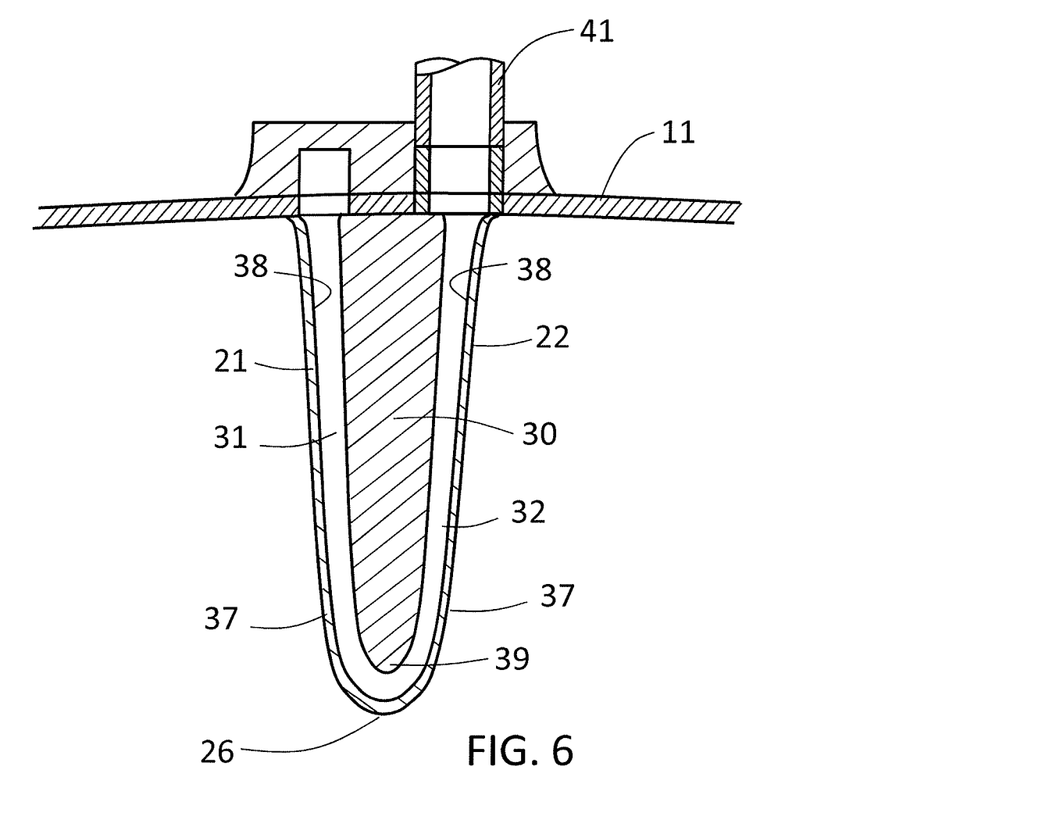
FIG. 6 shows an elevation section view of the cooling stator vane through line 6-6 of FIG. 2.

FIGS. 4 and 6 illustrate a cooling stator vane 20 of the invention. FIG. 4 shows a cross section of a cooling stator vane 20 having a length along a centerline 26 from a leading edge 24 to a trailing edge 25 of the stator vane, and including an outer wall that includes a first outer wall 21 and a second outer wall 22 that are connected at the leading edge 24 and the trailing edge 25 and along a distal end 26 to define an internal passage 23. An internal flow divider wall 30 disposed within the internal passage and extending along the centerline 26 divides the internal passage into at least two laterally-wide and shallow flow pathways, including an inflow pathway 31 and an outflow pathway 32 that communicates fluidly with the inflow pathway 31 around the distal edge 39 of the divider wall 30 (FIG. 6). The first outer wall 21 defines the convex wall surface of the stator vane, and second outer wall 22 defines the concave wall surface of the stator vane. The outer wall has an outer surface 27 that is in contact with the compressed airflow, and an inner surface 28 that is in contact with the internal passage 23 and the cooling fluid therein. The flow divider wall 30 is oriented along the centerline 26 to form the two laterally wide and shallow pathways 31 and 32 between the distal end 26 of the stator vane 20 to the base end 27. Pathway 31 is defined by the space between the inner surface 38 of the first outer wall 21 and the internal flow divider wall 30, and pathway 32 is defined by the space between the inner surface 38 of the second outer wall 22 and the internal flow divider wall 30. A leading edge 35 of the flow divider wall 30 can be disposed immediately adjacent to or connected to the leading edge 24 of the outer wall, to minimize or prevent short-circuiting of the cooling fluid around the sides edges of the flow divider wall 30. Likewise, a trailing edge 36 of the flow divider wall 30 can be disposed immediately adjacent to or connected to the trailing edge 25 of the outer wall. The coolant fluid enters into the stator vane 20 on the convex suction side of the stator vane, through pathway 31, to take full advantage of the thin laminar air boundary layer along the outside surface of the first outer wall 21, providing high heat transfer. The coolant fluid passes through the pathway 31 to the distal end 26 of the stator vane 26, around the distal edge 39 of the internal flow divider wall 30 (FIG. 6), and then returns on the concave pressure side of the stator vane, through pathway 32, where the outside surface of the second outer wall 22 has thicker turbulent air boundary layers.

The thickness of the outer walls 21 and 22 are minimized to increase heat transfer from the outer surface 37 into the cooling fluid passing along the inner surfaces 38 of the outer walls 21 and 22, while the fluid pathways 31 and 32 are likewise minimized in thickness or depth to promote increase coolant fluid flow velocity through the pathways 31 and 32, to maximize heat withdraw from the outer walls.

Figure 5:
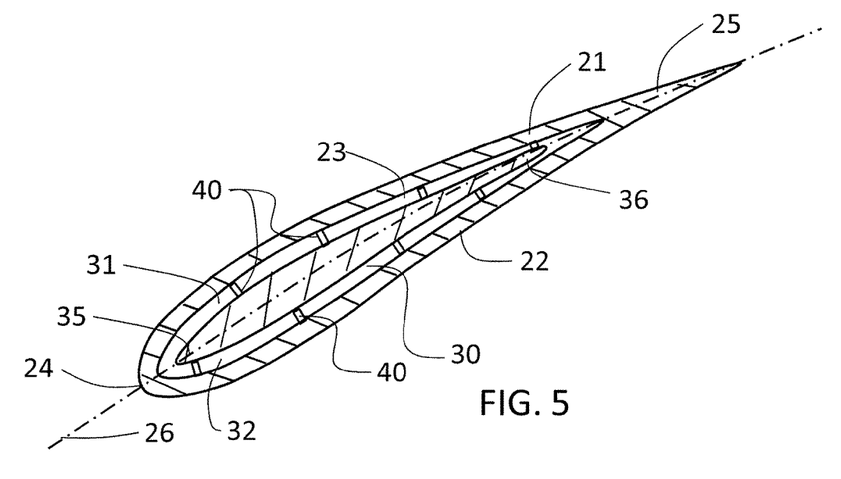
FIG. 5 shows an alternative embodiment of the cooling stator vane of FIG. 4.

Extensive testing of the design details of this configuration with a single stator vane can assist in determining the optimum configuration of the highest heat transfer effectiveness. The FIG. 5 illustrates an alternative embodiment of a cooling stator vane 120 of the invention, wherein the leading edge 35 and trailing 36 edge of the internal flow divider wall 30 are spaced a distance from the respective leading edge 24 and trailing edge 25 of the outer wall. While providing an increase in the surface area of the inner surface of the outer wall that is exposed to cooling fluid, some amount of cooling fluid may short circuit around the side edges of the internal flow divider wall 30. A plurality of support elements, illustrated as posts 40, connect the outer walls 21 and 22, respectively, with the internal flow divider wall 30, to improve the structural stability of the thin outer walls 22. The support elements can also include elongated ribs or fins oriented in the vertical direction with the direction of coolant fluid flow through the pathways 31 and/or 32, and connected to wither the outer wall or the interior flow divider wall, or both.

Figure 7:
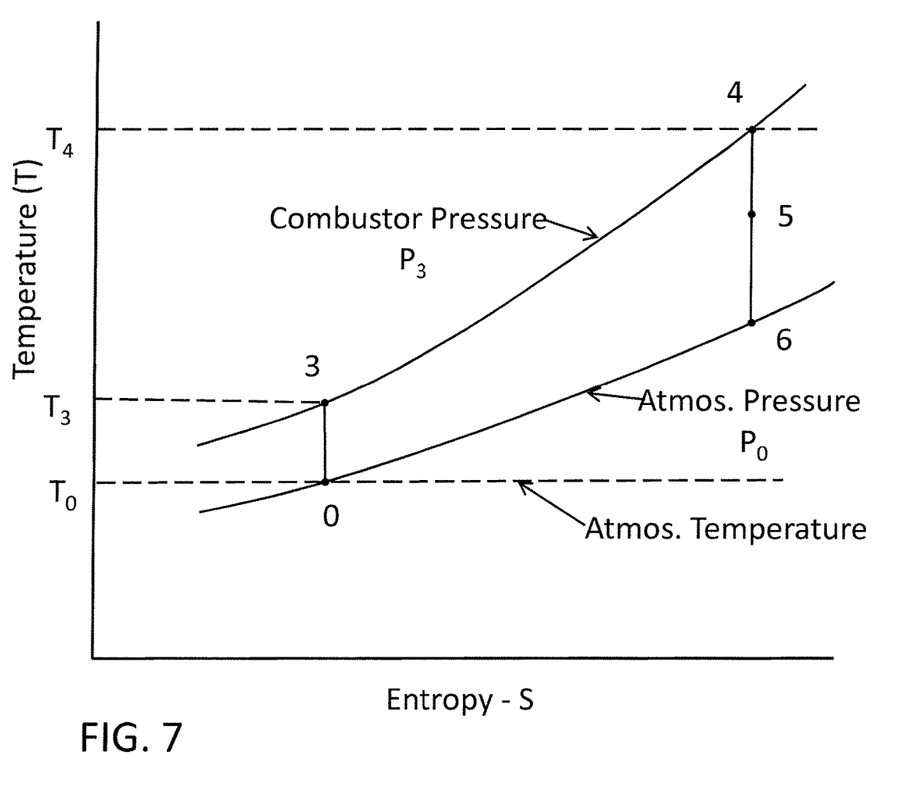
FIG. 7 shows a temperature-entropy diagram of a conventional gas turbine engine.

A temperature-entropy diagram of a conventional gas turbine engine is illustrated in FIG. 7. The entropy increases as the fuel is burned in the combustor from cycle points 3 to 4. Cycle points 0 to 3 show the isentropic increase in the compressor pressure from the compressor inlet to the outlet stations. Cycle point 4 shows the maximum turbine inlet temperature. The turbine expands the flow down to the temperature at point 5 which provides the power required for the compressor. Point 5 to point 6 represents the power output of the engine. Depending on the requirements of the aircraft, some of this power is used to drive a propeller for a propjet or a multistage fan for a fanjet, and some of this power is used to provide the thrust force.

Figure 8:
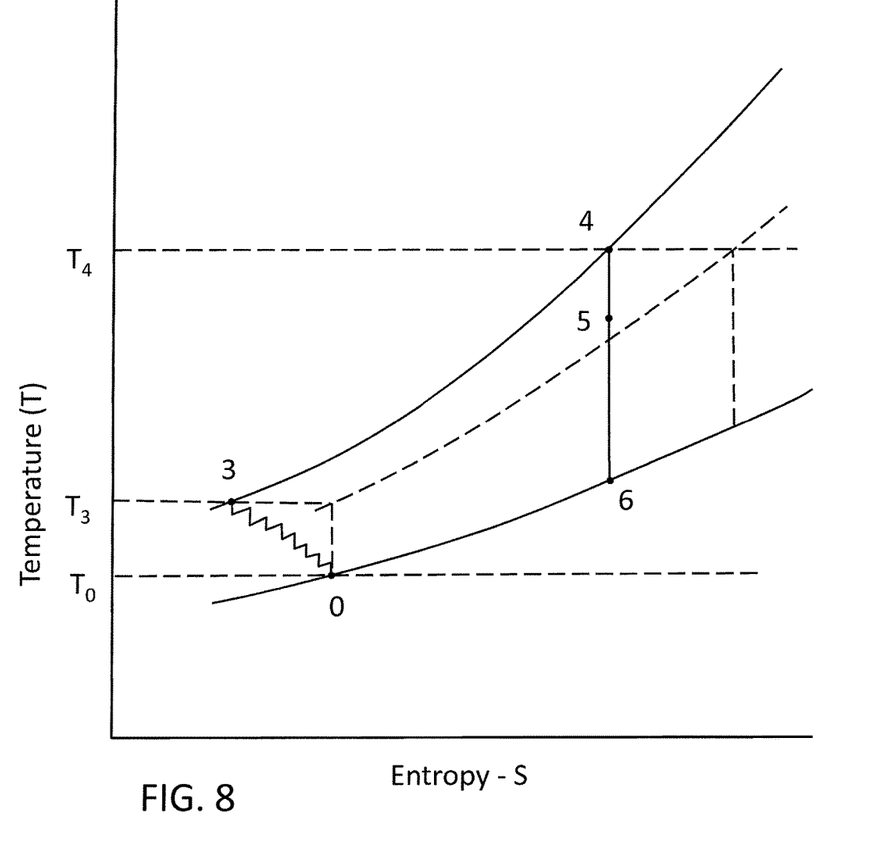
FIG. 8 shows a temperature-entropy diagram for the gas turbine engine with the intercooled compressor of the present invention.

A temperature-entropy diagram for the gas turbine engine with the intercooled compressor is illustrated in FIG. 8. The entropy increases as the fuel is burned in the combustor from cycle points 3 to 4. Cycle points 0 to 3 show the increase in the compressor pressure and the decrease in the entropy and temperature in each stage, from the compressor inlet to the outlet stations. Cycle point 4 shows the maximum turbine inlet temperature. The turbine expands the flow down to the temperature at point 5, which provide the power required for the compressor. Point 5 to point 6 represents the power output of the engine. Depending on the requirement of the aircraft, some of this power is used to drive a propeller for a propjet or a multistage fan for a fan jet, some of this power is used to provide the thrust force.

The hot gases from each stage of the multistage compressor, as shown from points 0 to 3, is cooled to a lower temperature until the limiting compressor exit temperature, as shown in FIG. 8, is reached. This temperature is the same as that of the conventional engine but with a much higher pressure ratio. The power required for this compressor is the same as that required for the conventional compressor because the temperature increase is the same. Cycle points 4 to 5 show the power required for the compressor. This cycle diagram shows the large increase in the power output of the engine. This extra power output can be used to increase the performance of the airplane with the same fuel flow, or to reduce the size of the engine for the same performance, with a much lower fuel now.

The stator vanes of the invention can be made any known technique, including casting and metal sheet forming, and from the same material as used for conventional stator vanes.

I claim:

1. A multi-stage intercooled compressor for a gas turbine engine, including multiple stages of rotating blades and cooling stator vanes, the cooling stator vane including an outer wall that defines an internal coolant fluid passage and has a length along a centerline from a leading edge to a trailing edge of the outer wall, and an internal flow divider wall disposed within the internal passage and extending along the centerline to divide the internal coolant fluid passage into an inflow pathway and an outflow pathway; wherein the multi-stage intercooled compressor includes an outer casing, wherein the outer wall includes a first outer wall and a second outer wall that are connected at the leading edge, the trailing edge and the distal end of the outer wall, and a base end attached to the outer casing, wherein the cooling vane further includes a coolant input connection and a coolant output connection, each extending through the outer casing to provide fluid communication between the internal coolant fluid passage and a coolant condensation and pumping system, and wherein the internal flow divider wall has a base end attached to the outer casing between the coolant input connection and the coolant output connection, and a distal end, and the internal coolant fluid passage is divided into an inflow pathway disposed between the internal flow divider wall and an interior surface of the first outer wall, and an outflow pathway disposed between the internal flow divider wall and the interior surface of the second outer wall, and wherein the distal end of the internal flow divider wall extends toward the distal end of the outer wall with a passage for a coolant fluid to pass around the distal edge of the internal flow divider wall from the inflow pathway to the outflow pathway.

2. The multi-stage intercooled compressor of claim 1, wherein the outer surface of the stator vane is substantially free of an extending cooling fin.

3. The multi-stage intercooled compressor of claim 1, wherein a surface area of an interior surface of the outer wall, exposed to cooling fluid, is at least about 90% of a surface area of an outer surface of the outer wall, exposed to compression air.

4. The multi-stage intercooled compressor of claim 1, wherein a leading edge of the internal flow divider wall is connected to the leading edge of the outer wall, and a trailing edge of the internal flow divider wall is connected to the trailing edge of the outer wall.

5. The multi-stage intercooled compressor of claim 1, wherein an outer surface of the internal flow divider wall is completely separated from an interior surface of the outer wall.

6. The multi-stage intercooled compressor of claim 5, wherein the outer surface of the internal flow divider wall and the interior surface of the outer wall are connected with one or more support members.

7. The multi-stage intercooled compressor of claim 1, wherein the outer wall includes a first outer wall and a second outer wall that are connected at their respective leading edges and trailing edges, and an interior surface of the first outer wall and an interior surface of the second outer wall define the internal coolant fluid passage, and wherein the inflow pathway is disposed between the internal flow divider wall and the interior surface of the first outer wall, and the outflow pathway is disposed between the internal flow divider wall and the interior surface of the second outer wall.

8. multi-stage intercooled compressor of claim 1, wherein the outer wall has no openings therethrough from the inside surface to the outside surface, and a cooling fluid recirculated through the internal coolant fluid passage is not in fluid communication with compression air on the outside surface of the outer wall.

9. A cooling stator vane including an outer wall that defines an internal coolant fluid passage and has a length along a centerline from a leading edge to a trailing edge of the outer wall, and an internal flow divider wall disposed within the internal passage and extending along the centerline to divide the internal coolant fluid passage into an inflow pathway and an outflow path; wherein the outer wall includes a first outer wall and a second outer wall that are connected at the leading edge, the trailing edge and the distal end of the outer wall, a base end configured to attach to portion of an outer casing of a multi-stage intercooled compressor, and a distal end, wherein the cooling stator vane further includes a coolant input connection and a coolant output connection, each extending through the outer casing to provide fluid communication with the internal coolant fluid passage, and wherein the internal flow divider wall has a base end configured to attached to the outer casing between the coolant input connection and the coolant output connection, and a distal end, wherein the inflow pathway is disposed between the internal flow divider wall and an interior surface of the first outer wall, and the outflow pathway is disposed between the internal flow divider wall and the interior surface of the second outer wall, and wherein the distal end of the internal flow divider wall extends toward the distal end of the outer wall with a passage for a coolant fluid to pass around the distal edge of the internal flow divider wall, from the inflow pathway to the outflow pathway.

10. The cooling stator vane of claim 9, wherein the outer surface. of the stator vane is substantially free of an extending cooling fin.

11. The cooling stator vane of claim 9, wherein the surface area of an interior surface of the outer wall, exposed to cooling fluid, is at least about 90% of a surface area of an outer surface of the outer wall, exposed to compression air.

12. The cooling stator vane of claim 9, wherein a leading edge of the internal flow divider wall is connected to the leading edge of the outer wall, and a trailing edge of the internal flow divider wall is connected to the trailing edge of the outer wall.

13. The cooling stator vane of claim 9, wherein an outer surface of the internal flow divider wall is completely separated from an interior surface of the outer wall.

14. The cooling stator vane of claim 13, wherein the outer surface of the internal flow divider wall and the interior surface of the outer wall are connected with one or more support members.

15. The cooling stator vane of claim 9, where the outer wall includes a first outer wall and a second outer wall that are connected at their respective leading edges and trailing edges, and an interior surface of the first outer wall and an interior surface of the second outer wall define the internal coolant fluid passage, and where the inflow pathway is disposed between the internal flow divider wall and the interior surface of the first outer wall, and the outflow pathway is disposed between the internal flow divider wall and the interior surface of the second outer wall.

16. The cooling stator vane of claim 9, wherein the outer wall has no openings therethrough from the inside surface to the outside surface, and a cooling fluid recirculated through the internal coolant fluid passage is not in fluid communication with compression air on the outside surface of the outer wall.

17. A method of cooling the compressed airflow passing through a multi-stage compressor, comprising the steps of: circulating a cooling liquid into a plurality of stator vanes of one or more stages of the multi-stage compressor, and passing the cooling liquid along an interior surface of an outer wall of the stator vane, wherein the cooling liquid has a vapor point below an air temperature in the compressor, thereby increasing the effectiveness of the cooling of the airflow through the compressor, resulting in an increase in the efficiency of engine and a reduction in the engine fuel consumption.

18. A method of claim 17 wherein the cooling stator vanes do not include external cooling fins that projection into the airflow path between the stator vanes, which can increase the pressure losses in the compressor and reduces the efficiency of the compressor.

\* \* \* \* \*